United States Patent
Alayli (10) Patent No.: US 12,147,386 B2
(45) Date of Patent: *Nov. 19, 2024

(54) HIGH DENSITY TIME-SERIES DATA INDEXING AND COMPRESSION

(71) Applicant: Hydrolix Inc., Portland, OR (US)

(72) Inventor: Hasan Alayli, San Francisco, CA (US)

(73) Assignee: Hydrolix Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,143

(22) Filed: Apr. 19, 2021

(65) Prior Publication Data

US 2021/0240663 A1 Aug. 5, 2021

Related U.S. Application Data

(63) Continuation of application No. 16/881,461, filed on May 22, 2020, now Pat. No. 10,983,954.

(60) Provisional application No. 62/852,617, filed on May 24, 2019.

(51) Int. Cl.
G06F 16/13 (2019.01)
G06F 16/182 (2019.01)

(52) U.S. Cl.
CPC ............ *G06F 16/13* (2019.01); *G06F 16/183* (2019.01)

(58) Field of Classification Search
None
See application file for complete search history.

(56) References Cited

U.S. PATENT DOCUMENTS

2014/0214888 A1* 7/2014 Marquardt .......... G06F 16/2455
707/769
2019/0230151 A1* 7/2019 Falcao .................. H04L 69/329

OTHER PUBLICATIONS

Jensen, Soren K., et al., "ModelarDB: Modular Model-Based Time Series Management with Spark and Cassandra", Aug. 2018, Proceedings of the VLDB Endowment, vol. 11, No. 11, pp. 1688-1701. (Year: 2018).*

* cited by examiner

Primary Examiner — Scott A. Waldron
(74) Attorney, Agent, or Firm — David H. Judson (57) ABSTRACT

Time-series columnar-based information is received and indexed in a compute infrastructure for cloud-based object storage. The approach leverages a file format that enables highly-performant search and retrieval of the data stored in the cloud. In operation, an indexer receives the time-series information, indexes that information according to the file format, and forwards the indexed information for storage to the object store, where it is stored as a set of time-based partitions. A partition comprises a set of files, namely, a manifest file, a data file, and an index file. These files are structured as a compact instance of a set of raw unstructured data that comprises the partition. Highly-performant information retrieval is enabled in response to a time-bounded query, because operations at a query peer (with respect to one or more partitions) are carried out in real-time during query processing and without requiring retrieval of the data file as a whole.

15 Claims, 10 Drawing Sheets

| FIELD | DESCRIPTION |
|---|---|
| TAGS MANIFEST | |
| num_blocks | TOTAL NUMBER OF BLOCKS IN tags.hdx |
| tag_ids | THE tag_id OF EACH BLOCK. A tag_id REPEATS FOR ALL ITS BLOCKS CONTAINING THE tag_values BELONGING TO IT |
| STARTS | LIST OF start_ids INDICATING THE START OFFSET OF EACH BLOCK |
| OFFSETS | LIST OF BLOCK OFFSETS |
| SIZES | LIST OF BLOCK SIZES |
| block_types | INTEGERS REPRESENTING THE TYPE OF EACH BLOCK |
| min_timestamps | LIST OF min_timestamp OF EACH BLOCK |
| max_timestamps | LIST OF max_timestamp OF EACH BLOCK |
| DictManifest | |
| num_blocks | TOTAL NUMBER OF BLOCKS IN DICT |
| num_values | TOTAL NUMBER OF VALUES IN ALL BLOCKS COMBINED |
| BlockManifest | |
| first_value_length | STRING LENGTH OF THE FIRST VALUE IN THE BLOCK |
| LENGTH | TOTAL NUMBER OF VALUES IN THE BLOCK |
| start_offset | START VALUE ID OF BLOCK |
| original_size | UNCOMPRESSED cmp_data size |
| cmp_size | COMPRESSED cmp_data SIZE |
| SIZE | TOTAL SIZE OF THE BLOCK (offsets + cmp_data) |
| cmp_data | COMPRESSED DATA CONTAINING THE STRINGS IN THE BLOCK |
| OFFSETS | START OFFSET OF EACH STRING IN THE BLOCK |
| pl_ids | A LIST OF LISTS WHERE EACH LIST CONTAINS pl_ids PERTAINING TO THE VALUES IN THE DICT |
| pl_ids_offsets | OFFSETS REFERENCING THE LISTS IN pl_ids |
| pl_locs | LIST CONTAINING THE OFFSET OF EACH pl_id |

```
Manifest {
    TagManifest {
        uint64 num_blocks;
        uint64 tag_ids[] : zigzag;
        uint64 starts [] : zigzag;
        uint64 block_types [] : zigzag;
        uint64 min_timestamps [] : zigzag;
        uint64 max_timestamps [] : zigzag;
    }
    DictManifest {
        uint64 num_blocks;
        uint64 num_values;
        {
            BlockManifest {
                uint64 first_value_length;
                uint64 length;
                uint64 start_offset;
                uint64 original_size;
                uint64 cmp_size;
                uint64 size;
            }
            string first_value;
            Bytes cmp_data : zstd;
            uint64 offsets [] : zigzag
        } [];
        uint64 pl_ids[#_values_per_dict_block] : zigzag[#_of_blocks]
        uint64 pl_ids_offsets [] : FOR
        uint64 pl_locs [] : FOR
    }
}
```

FIG. 3

| FIELD | DESCRIPTION |
|---|---|
| TAGS MANIFEST | |
| num_blocks | TOTAL NUMBER OF BLOCKS IN tags.hdx |
| tag_ids | THE tag_id OF EACH BLOCK. A tag_id REPEATS FOR ALL ITS BLOCKS CONTAINING THE tag_values BELONGING TO IT |
| STARTS | LIST OF start_ids INDICATING THE START OFFSET OF EACH BLOCK |
| OFFSETS | LIST OF BLOCK OFFSETS |
| SIZES | LIST OF BLOCK SIZES |
| block_types | INTEGERS REPRESENTING THE TYPE OF EACH BLOCK |
| min_timestamps | LIST OF min_timestamp OF EACH BLOCK |
| max_timestamps | LIST OF max_timestamp OF EACH BLOCK |
| DictManifest | |
| num_blocks | TOTAL NUMBER OF BLOCKS IN DICT |
| num_values | TOTAL NUMBER OF VALUES IN ALL BLOCKS COMBINED |
| BlockManifest | |
| first_value_length | STRING LENGTH OF THE FIRST VALUE IN THE BLOCK |
| LENGTH | TOTAL NUMBER OF VALUES IN THE BLOCK |
| start_offset | START VALUE ID OF BLOCK |
| original_size | UNCOMPRESSED cmp_data size |
| cmp_size | COMPRESSED cmp_data SIZE |
| SIZE | TOTAL SIZE OF THE BLOCK (offsets + cmp_data) |
| cmp_data | COMPRESSED DATA CONTAINING THE STRINGS IN THE BLOCK |
| OFFSETS | START OFFSET OF EACH STRING IN THE BLOCK |
| pl_ids | A LIST OF LISTS WHERE EACH LIST CONTAINS pl_ids PERTAINING TO THE VALUES IN THE DICT |
| pl_ids_offsets | OFFSETS REFERENCING THE LISTS IN pl_ids |
| pl_locs | LIST CONTAINING THE OFFSET OF EACH pl_id |

FIG. 4

```
{
    uint64 dict_ids [] [] : zigzag;
}
```

FIG. 5

```
{
    uint64 values [] [] : zigzag;
}
```

FIG. 6

```
{
    uint64 timestamps [] [] : zigzag;
}
```

FIG. 7

```
{
    uint64 record_id [] [] : zigzag;
}
```

FIG. 8

{"tags": {"pop": "aws-eu-west-2", "node": "ingest-1", "turbine_version": "1.0.2", "namespace": "FH858LGX7", "namespace_version": "3"}, "metrics": {"push_messages": 1240354, "push_errors": 117, "queue_depth": 77948}, "timestamp": 1543419881}
{"tags": {"pop": "aws-eu-west-2", "node": "ingest-1", "turbine_version": "1.0.2", "namespace": "FH858LGX7", "namespace_version": "3"}, "metrics": {"push_messages": 1270991, "push_errors": 122, "queue_depth": 131019}, "timestamp": 1543419878}
{"tags": {"pop": "aws-eu-west-2", "node": "ingest-1", "turbine_version": "1.0.2", "namespace": "FH858LGX7", "namespace_version": "3"}, "metrics": {"push_messages": 1300512, "push_errors": 175, "queue_depth": 98774}, "timestamp": 1543419877}
{"tags": {"pop": "aws-eu-west-2", "node": "ingest-1", "turbine_version": "1.0.2", "namespace": "FH858LGX7", "namespace_version": "3"}, "metrics": {"push_messages": 1267474, "push_errors": 98, "queue_depth": 65912}, "timestamp": 1543419876}
{"tags": {"pop": "aws-eu-west-2", "node": "ingest-1", "turbine_version": "1.0.2", "namespace": "FH858LGX7", "namespace_version": "3"}, "metrics": {"push_messages": 1251123, "push_errors": 104, "queue_depth": 37388}, "timestamp": 1543419875}
{"tags": {"pop": "aws-eu-west-2", "node": "ingest-1", "turbine_version": "1.0.2", "namespace": "FH858LGX7", "namespace_version": "3"}, "metrics": {"push_messages": 1290110, "push_errors": 216, "queue_depth": 21003}, "timestamp": 1543419874}

{"tags": {"pop": "aws-us-east-1", "node": "ingest-4", "namespace": "AB412MPO4", "namespace_version": "41"}, "metrics": {"push_messages": 12, "push_errors": 12, "queue_depth": 0}, "timestamp": 1543419881}
{"tags": {"pop": "aws-us-east-1", "node": "ingest-4", "namespace": "AB412MPO4", "namespace_version": "41"}, "metrics": {"push_messages": 12, "push_errors": 12, "queue_depth": 0}, "timestamp": 1543419878}
{"tags": {"pop": "aws-us-east-1", "node": "ingest-4", "namespace": "AB412MPO4", "namespace_version": "41"}, "metrics": {"push_messages": 13, "push_errors": 13, "queue_depth": 0}, "timestamp": 1543419877}

FROM FIG. 9A

{"tags": {"pop": "aws-us-east-1", "node": "ingest-4", "namespace": "AB412MPO4", "namespace_version": "40"}, "metrics": {"push_messages": 13, "push_errors": 13, "queue_depth": 0}, "timestamp": 1543419876}
{"tags": {"pop": "aws-us-east-1", "node": "ingest-4", "namespace": "AB412MPO4", "namespace_version": "40"}, "metrics": {"push_messages": 12, "push_errors": 12, "queue_depth": 0}, "timestamp": 1543419875}
{"tags": {"pop": "aws-us-east-1", "node": "ingest-4", "namespace": "AB412MPO4", "namespace_version": "40"}, "metrics": {"push_messages": 15, "push_errors": 15, "queue_depth": 0}, "timestamp": 1543419874}
{"tags": {"pop": "aws-us-east-1", "node": "ingest-2", "namespace": "NC993SWQ1", "namespace_version": "2"}, "metrics": {"push_messages": 124, "push_errors": 0, "queue_depth": 7}, "timestamp": 1543419881}
{"tags": {"pop": "aws-us-east-1", "node": "ingest-2", "namespace": "NC993SWQ1", "namespace_version": "1"}, "metrics": {"push_messages": 127, "push_errors": 0, "queue_depth": 11}, "timestamp": 1543419878}
{"tags": {"pop": "aws-us-east-1", "node": "ingest-2", "namespace": "NC993SWQ1", "namespace_version": "1"}, "metrics": {"push_messages": 130, "push_errors": 0, "queue_depth": 9}, "timestamp": 1543419877}
{"tags": {"pop": "aws-us-east-1", "node": "ingest-2", "namespace": "NC993SWQ1", "namespace_version": "1"}, "metrics": {"push_messages": 126, "push_errors": 0, "queue_depth": 6}, "timestamp": 1543419876}
{"tags": {"pop": "aws-us-east-1", "node": "ingest-2", "namespace": "NC993SWQ1", "namespace_version": "1"}, "metrics": {"push_messages": 125, "push_errors": 0, "queue_depth": 3}, "timestamp": 1543419875}

FIG. 9B

```
columns
(there are 8 unique tags in our data. see dictionary below for details)
(file_offset = byte offset of the first block of each column section in tags.hdx)
(there may be multiple blocks per column because we stop at 8k)
(tag names are always strings, metric names are always doubles)
[
  {"column_id": 0, "file_offset": 0, "data_type": "string", "num_blocks": 2}, (namespace)
  {"column_id": 1, "file_offset": 10, "data_type": "string", "num_blocks": 2}, (namespace_version)
  {"column_id": 2, "file_offset": 20, "data_type": "string", "num_blocks": 2}, (node)
  {"column_id": 3, "file_offset": 30, "data_type": "string", "num_blocks": 2}, (pop)
  {"column_id": 4, "file_offset": 40, "data_type": "string", "num_blocks": 1}, (turbine_version)
  {"column_id": 5, "file_offset": 0, "data_type": "double", "num_blocks": 2}, (push_errors)
  {"column_id": 6, "file_offset": 10, "data_type": "double", "num_blocks": 2}, (pushed_messages)
  {"column_id": 7, "file_offset": 20, "data_type": "double", "num_blocks": 2}, (queue_depth)
``` time_ranges
(this tells me which rows I need or can ignore. see above for file_offsets)
[
  (min_timestamp, max_timestamp),
  (min_timestamp, max_timestamp)
]

Dict
[
  (0) '!T::namespace',
  (1) '!T::namespace_version',
  (2) '!T::node',
```

FROM FIG. 10A

```
{"column_id": -1, "file_offset": 0, "data_type": "double", "num_blocks": 2}, (timestamp)
]
column_blocks
(row_id, file_offset)
(there should be 14 total: 2x8)
(the first 10 refer to tags.hdx. the last 5 refer to value.hdx)
[
[0, 0], [6, 5], (namespace)
[0, 10], [6, 15], (namespace_version)
[0, 20], [6, 25], (node)
[0, 30], [6, 35], (pop)
[0, 40], (turbine_version)

(3) '!T::pop',
(4) '!T::turbine_version',
(5) '!M::push_errors',
(6) '!M::pushed_messages',
(7) '!M::queue_depth',
(8) 'namepace::0::FH858LGX7',
(9) 'namepace::1::AB412MPO4',
(10) 'namepace::1::NC993SWQ1',
(11) 'namepace_version::0::3',
(12) 'namepace_version::1::1',
(13) 'namepace_version::1::2',
(14) 'namepace_version::1::40',
(15) 'namepace_version::1::41',
(16) 'node::0::ingest-1',
(17) 'node::1::ingest-2',
(18) 'node::1::ingest-4',
(19) 'pop::0::aws-eu-west-2',
(20) 'pop::1::aws-us-east-1',
(21) 'turbine_version::0::1.0.2'
]

PostingListOffsets (referring to array blocks in index.hdx)
[off1, off2, ..., off22]

[0, 0], [6, 5], (push_errors)
[0, 10], [6, 15], (pushed_messages)
[0, 20], [6, 25], (queue_depth)
[0, 20], [6, 25], (timestamp)
]
```

FIG. 10B

```
(notation: "row_id":"file_offset")
(note: I made up these file_offsets for simplicity)
(see dictionary to translate array elements into specific tag values)
! !T: :namespace values
(0:0)   [8, 8, 8, 8, 8, 8]
(6:5)   [9, 9, 9, 9, 9, 9, 10, 10, 10, 10, 10, 10]

! !T: :namespace_version values
(0:10)  [11, 11, 11, 11, 11, 11]
(6:15)  [15, 15, 15, 14, 14, 14, 13, 12, 12, 12, 12, 12]

! !T: :node values
(0:20)  [16, 16, 16, 16, 16, 16]
(6:25)  [18, 18, 18, 18, 18, 18, 17, 17, 17, 17, 17, 17]

! !T: :pop values
(0:30)  [19, 19, 19, 19, 19, 19]
(6:35)  [20, 20, 20, 20, 20, 20, 20, 20, 20, 20, 20, 20]

! !T: :turbine_version values
(0:40)  [21, 21, 21, 21, 21, 21]
```

FIG. 11

```
(one array per schema, ordered by something magical)
[1543419881, 1543419878, 1543419877, 1543419876, 1543419875, 1543419874]
[1543419881, 1543419878, 1543419877, 1543419876, 1543419875, 1543419874, 1543419
881, 1543419878, 1543419877, 1543419876, 1543419875, 1543419874]
```

FIG. 12

```
(notation: "row_id":"file_offset" with made-up offsets)

(push_errors)
(0:0) [117, 122, 175, 98, 104, 216]
(6:5) [12, 12, 13, 13, 12, 15, 0, 0, 0, 0, 0, 0]

(pushed_messages)
(0:10) [1240354, 1270991, 1300512, 1267474, 1251123, 1290110]
(6:15) [12, 12, 13, 13, 12, 15, 124, 127, 130, 126, 125, 129]

(queue_depth)
(0:20) [77948, 131019, 98774, 65912, 37388, 21003]
(6:25) [0, 0, 0, 0, 0, 0, 7, 11, 9, 6, 3, 2]
```

FIG. 13

```
(rows matches the order of the dictionary)
(array elements represent rows. see manifest column block for details)

(0)  [0, 1, 2, 3, 4, 5, 6, 7, 8, 9, 10, 11, 12, 13, 14, 15, 16, 17] (namespace)
(1)  [0, 1, 2, 3, 4, 5, 6, 7, 8, 9, 10, 11, 12, 13, 14, 15, 16, 17] (namespace_version)
(2)  [0, 1, 2, 3, 4, 5, 6, 7, 8, 9, 10, 11, 12, 13, 14, 15, 16, 17] (node)
(3)  [0, 1, 2, 3, 4, 5] (pop)

(4)  [0, 1, 2, 3, 4, 5, 6, 7, 8, 9, 10, 11, 12, 13, 14, 15, 16, 17] (turbine_version)
(5)  [0, 1, 2, 3, 4, 5, 6, 7, 8, 9, 10, 11, 12, 13, 14, 15, 16, 17] (push_errors)
(6)  [0, 1, 2, 3, 4, 5, 6, 7, 8, 9, 10, 11, 12, 13, 14, 15, 16, 17] (pushed_messages)

(7)  [0, 1, 2, 3, 4, 5] (queue_depth)
(8)  [0, 1, 2, 3, 4, 5] (namespace=FH858LGX7)
(9)  [6, 7, 8, 9, 10, 11] (namespace=AB412MPO4)
(10) [12, 13, 14, 15, 16, 17] (namespace=NC993SWQ1)
(11) [14, 15, 16, 17] (namespace_version=3)
(12) [13, 14, 15, 16, 17] (namespace_version=1)
(13) [12] (namespace_version=2)
(14) [6, 7, 8] (namespace_version=40)
(15) [0, 1, 2, 3, 4, 5] (namespace_version=41)
(16) [12, 13, 14, 15, 16, 17] (node=ingest-1)
(17) [6, 7, 8, 9, 10, 11] (node=ingest-2)
(18) [0, 1, 2, 3, 4, 5] (node=ingest-4)
(19) [] (pop=aws-eu-west-2)
(20) [] (pop=aws-us-east-1)
(21) [] (turbine_verion=1.02)
```

FIG. 14

HIGH DENSITY TIME-SERIES DATA INDEXING AND COMPRESSION

BACKGROUND OF THE INVENTION

Technical Field

This application relates generally to time series-based data storage and retrieval.

Background of the Related Art

Streaming data is data that is continuously generated by different sources. Data generated from certain data sources, such as devices in the Internet of Things (IoT), or IT services, include (or can be modified to include) a timestamp. Streamed time-series data of this type is being generated continuously, driving a need for new and efficient information storage and retrieval services. Known techniques for storing and retrieving time-series data include cloud-based object storage services (e.g., Amazon® S3, Google® Cloud, and the like). These services are advantageous, as theoretically they are highly-scalable and reliable. That said, as the volume of time-series data being stored to the cloud increases, information retrieval (e.g., for data analysis, etc.) becomes very difficult. The problem is exacerbated for OLAP (online analytical processing) applications, where reading a high volume of data records (e.g., for aggregation) is a common use case. The problem arises because reading from a remote storage is much slower than reading from a local storage, thereby requiring a different data storage and retrieval strategy to store and read the data records. Practically, the slowness derives from the requirement that every (theoretically local) disk seek is equivalent to an HTTP request over the network to the remote store, and local disk throughput is significantly higher than the throughput obtained from remote object store when requesting a single file. As data volumes continue to increase exponentially, efficient and cost-effective information storage and retrieval for the type of data is an intractable problem.

There remains a need to provide for new techniques for information storage, search and retrieval of time-series based data to address these and other problems of the known art.

BRIEF SUMMARY

According to this disclosure, time-series data and, in particular, time-series columnar-based information, is received and indexed in a compute infrastructure for cost-effective cloud-based object storage, yet in a unique database file format that enables highly-performant search and retrieval of the data stored in the cloud. The database file format (referring to herein as an "HDX file") advantageously enables the compute infrastructure (indexing and information retrieval) to be separated from the remote storage, thereby enabling both to scale. Using the HDX file format, the data is stored in a much more cost-effective manner (in the cloud object store), while still enabling that data to be efficiently searched, accessed and retrieved back to the compute infrastructure as if were present locally.

In one embodiment, the compute infrastructure comprises several components (services) including an indexer (for data ingest and storage), and a search engine (for query and information retrieval). The infrastructure may also include additional components (services) to facilitate or support the information storage, search and retrieval operations. The compute infrastructure interoperates with a network-accessible remote store, such as a cloud-based object store. Typically, the cloud-based object store is managed by another entity (e.g., a cloud service provider). In operation, the indexer receives the time-series columnar-based information from a data source (as an input), indexes that information according to the database file format, and forwards the indexed information for storage to the cloud-based object store, where it is stored as a set of time-based partitions. Preferably, the information is stored across the cloud-based object store in directories, each of which include a set of files that comprise the HDX file format.

According to one aspect of this disclosure, the set of files preferably comprise a manifest file, a data file, and an index file. The manifest file includes a dictionary of data strings seen in a column during indexing of the information, together with byte-range data configured to selectively retrieve data from the data and index files. The data file stores column data seen during the indexing, and the index file contains a listing (e.g., a posting-list) for each data string in the manifest file. In this approach, the column data is stored in the data file in contiguous byte-ranges. As data is streamed into the compute infrastructure, it is continuously processed by the indexer and transferred to cloud-based object store where it is stored in the set of time-based partitions and according to the HDX file format.

The techniques herein provide for efficient storage (at the remote object store) and, in particular, because the manifest file, the index file and the data file for the given partition together comprise a compact instance of a set of raw unstructured data that comprises the given partition.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which:

FIGS. 9A and 9B depict a sample data set;

FIG. 13 depicts a values portion of the data.hdx file derived from the sample data set; and FIG. 14 depicts a index.hdx file derived from the sample data set.

DETAILED DESCRIPTION

Figure 1:
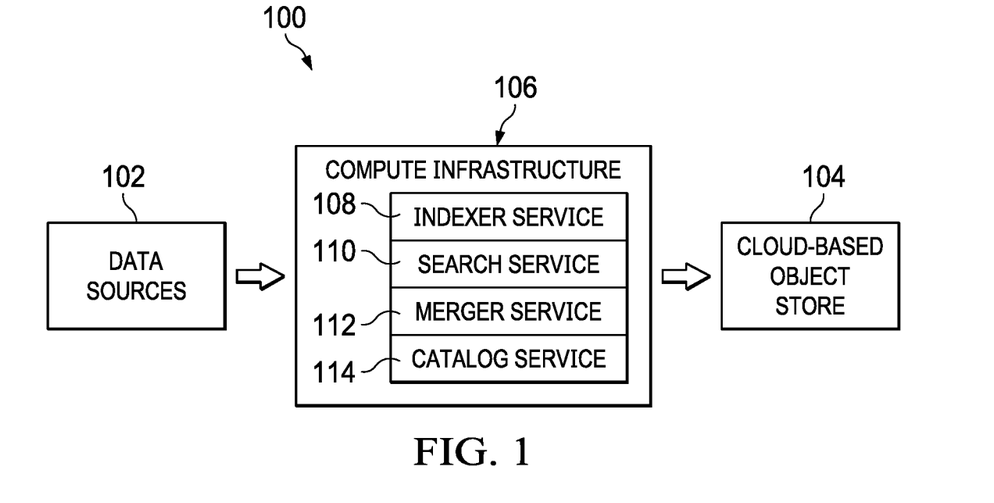
FIG. 1 depicts a high level architecture of a set of services that comprise a solution for time-series data compression and retrieval according to this disclosure.

FIG. 1 is an overall system 100 in which the techniques of this disclosure may be carried out. As noted, typically the data stored using the techniques herein is of a particular type, namely, time-series columnar-based information. In this usual case, streamed time-series data of this type is being generated continuously from one or more data sources 102, such as IoT devices, log sources, or the like. The nature and type of these data source(s) is not an aspect of this disclosure. Typically, the data is configured for storage in a network-accessible data store, such as a cloud-based object store 104. There may be multiple such object store(s), and the nature, number and type of these object store(s) is not an aspect of this disclosure either. Representative object storage is Amazon S3, Google Cloud, and many others. Stated another way, the techniques herein assume one or more data source(s) 102 of the time-series data, as well as the existence of one or more data store(s) 104 for that data, but these constructs typically are external to the compute infrastructure itself.

The compute infrastructure (or platform) 106 preferably comprises a set of services (or components) namely, an indexer service 108, a search service 110, a merger service 112, and a catalog service 114. One or more of these services may be combined with one another. A service may be implemented using a set of computing resources that are co-located or themselves distributed. Typically, a service is implemented in one or more computing systems. FIG. 1 is a logical diagram, as typically only the indexer service 108 sits between the data sources and the cloud-based object store. The computing platform (or portions thereof) may be implemented in a dedicated environment, in an on-premises manner, as a cloud-based architecture, or some hybrid. A typical implementation of the compute infrastructure is in a cloud-computing environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform of this disclosure may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Referring back to FIG. 1, the basic operation of the indexer service 108 is to receive the time-series information from the one or more data sources 102, and to convert this data into a unique format. As referenced above, the format is sometimes referred to herein as the HDX file format (or database). This nomenclature is not intended to be limiting. As will be seen, the HDX DB is a time-series, columnar, and schema-less storage format comprised of a root directly, and subdirectories containing so-called HDX files (preferably of three (3) distinct types) that are optimized for remote access. As will be described, this optimized file format allows the indexer service 108 to store the information (as the HDX DB) in the one or more cloud-based object stores 104 for efficient access and retrieval via a set of individual requests (typically, HTTP or HTTPS GET requests) that, collectively, comprise a search query. To this end, the basic operation of the search service is to receive a search query, interrogate the catalog service 114 to find potentially-relevant partitions of the time-series (stored in the remote data store(s)) to fetch, assign the identified partitions (for retrieval) to one or more computing resources (e.g., query peers), and then actively retrieve the HDX DB files (and their associated data) from the remote data store(s) for assembly into a response to the query. In one embodiment, the search service typically exposes an interface, e.g., a web interface, by which a query is formulated and executed. In an alternative embodiment, a query is generated automatically or programmatically, and then received for action (search and retrieval). By virtue of the HDX DB structure, queries can be of various types (e.g., full-text index, sequential access, random access, etc.). Without intending to be limiting, typically a query is designed for online analytical processing (OLAP), where reading a high volume of records (from the remote store(s)) is the common use case. The particular purpose of the query, and/or what is done with the information retrieved, however, are not a limitation of this disclosure.

In one embodiment, the indexer service 108 comprises one or more stateless "stream" peers. A stream peer typically is a physical computing machine, or a virtual machine executing in a virtualized environment. For example, a physical computing machine is a rack-mounted server appliance comprising hardware and software; the hardware typically includes one or more processors that execute software in the form of program instructions that are otherwise stored in computer memory to comprise a "special purpose" machine for carrying out the query peer functionality described herein. Alternatively, the stream peer is implemented as a virtual machine or appliance (e.g., via VMware®, or the like), as software executing in a server, or as software executing on the native hardware resources of some other system supported a virtualized infrastructure (such as a hypervisor, containers, and the like). Stream peers may be configured as co-located computing entities or, more typically, as a set of distributed computing entities.

As information to be indexed streams into the architecture, a stream peer (e.g., one acting as a leader or head) distributes the indexing workload to one or more stream peers, thereby enabling a set of stream peers to take part in the indexing process. When multiple stream peers are used, the time-based partitions being indexed are spread evenly across a set of the stream peers, although this is not a requirement. As will be described, each stream peer then indexes the HDX partition it was assigned, does a partial aggregation of the results, and then returns back the partial results to the stream peer head that is coordinating the overall indexing operation. Once the stream peer head receives the partial aggregate results from its peers, it performs a final aggregation and forwards the resulting set of HDX files (the manifest, data, and index) to the cloud store.

In another embodiment, the indexer service 108 uses one or more peers configured as batch peers for importing previously stored data.

During the data indexing process, preferably the indexer service builds small inverted index files (the HDX files described below) and stores them in the remote storage, as has been described. Having a large number of small files to evaluate during search, however, can degrade performance. To address this, the merger service 112 is provided. On-demand, periodically or continuously, the merger service 112 (e.g., configured as a cluster of merger computing peers) examines the catalog of files in the remote storage (as identified by the catalog service 114) and configures jobs identifying files to be merged (in the cloud). Preferably, the merger service configures a merger job based on various factors, such as volume of data, network location, local processing resources, etc.

The HDX file (storage) format is a highly-compacted format that generally contains an index, together with compacted raw data. This construct is now described in detail. As previously mentioned, according to this disclosure HDX DB is a time-series, columnar, and schema-less storage format comprised of a root directory (or folder), and subdirectories (or subfolders) containing HDX files that are optimized for remote access. In a preferred embodiment, the directory structure is as follows:

<namespace>
  <day>
    part<0>
      manifest.hdx
      data.hdx
      index.hdx
    part<n>

The HDX file format overcomes the seek and throughput limitations in object stores through various optimizations, which are now described.

Indexing

Indexing is performed by the indexing service. Preferably, indexing occurs in batches. Once the indexer service receives enough messages or records, the service indexes them into a part<n> including the .hdx format files, pushes the resulting message segment to remote storage, and notifies the catalog service to catalog the new files. In one example, assume that the data arrives in messages that can be organized into a nested form, such as follows:

timestamp=<uint 64>
tag_name1=<string>
tag_name2=<string> . . .
metrics
  metric_name1=<double>
  metric_name2=<double> . . . .

Because the HDX database preferably is schema-less, and in the example assume that tag_names and metric_names (and their combinations) vary from one record or message to another. When the data is indexed, the indexing service preferably groups the records that have the same tag_names and metric_names, and it gives them a group_id that is then used during the indexing process to determine a most-efficient sorting order for this group. In one implementation, a dictionary of tag_names with a prepended key type identifier and an embedded group number (such as ! ! T::<tag_name>::<group_id> is generated. Similarly, preferably tag_values are listed in a dictionary in a format such as follows: <tag_name>:::<group_id>:::<value> and metric_names as ! M::<metric_name>. Preferably, the dictionary entries are used to limit the impact of cardinality/entropy of the values to the group. This is useful when various data sources are sending records that have some common tag_names. The impact limitation happens when the tags are stored in the database dictionary they get sorted before being stored. Once they are stored, the tags get assigned position ids; because the <tag_name>:::<group_id> is prepended to the tag values, however, the ids belonging to the same group are next to each other. This operation improves storage and retrieval efficiency.

Preferably, the sorting order of all records in the batch is determined on a per group basis. Within a group, the order is controlled by the tag_names cardinality. The tag names are reorganized from lowest-to-highest cardinality. This approach works particularly well when tag_names with high cardinality are less likely to be filtered on in queries, or when tag_names with low cardinality are more likely to be filtered on. In some applications, tag_names with high cardinality tend to be aggregated, which requires fetching most of the messages that include the high cardinality tag_name. Ordering messages by groups and then by increasing tag cardinality within groups improves compressibility in case of high cardinality tags.

Consider the following example:
  host=<value>ip=<value>cluster=<value>cpu=1 net_io=2
    timestamp=1234
  host=<value>ip=<value>cluster=<value>cpu=1 net_io=2
    timestamp=1234
  host=<value>ip=<value>cluster=<value>cpu=1 net_io=2
    timestamp=1234
  host=<value>ip=<value>cluster=<value>cpu=1 net_io=2
    timestamp=1234

To determine the best sorting order, preferably the indexer service considers the cardinality of each of the tags. Assume the result is cluster, host, ip from lowest-to-highest cardinality. Then when sorting all the records in the batch, the records in this group get sorted in this order.

File Format and Layout

Preferably, the HDX DB uses dictionary encoding for all string values. Accordingly, typically there will one global dictionary that contains all unique string values that are seen during the indexing process. For unsorted doubles and ints, preferably delta zigzag encoding is used; for sorted ints, preferably FOR encoding is used.

In one embodiment, the following terminology is adopted. A "tag_id" is an integer representing a string in an array of strings (dictionary). A tag_name, tag_value, metric_name, etc. are all represented as tag_ids. A "block" is a structure containing a list of values, and the values can be of type int, double or string. The bracket notation [ ] [ ] refers to a list of lists.

Preferably, the HDX file format comprises a set of files, which are now described. As noted above, the nomenclature herein is not intended to be limited.

Figure 2:
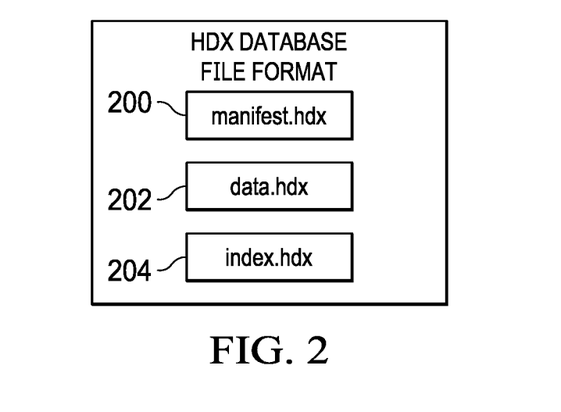
FIG. 2 depicts a representative structure of the HDX database file format of this disclosure.

With reference to FIG. 2, the file "manifest.hdx" 200 preferably contains all of the information necessary to navigate the other HDX files, namely, "data.hdx" 202 and "index.hdx" 204. The manifest.hdx file 200 contains the unique strings dictionary that the data.hdx file references. As will be described, this allows the search service (a query peer in particular) to download necessary blocks directly during a search and without having to seek and navigate the file to reach a particular block.

Figure 3:
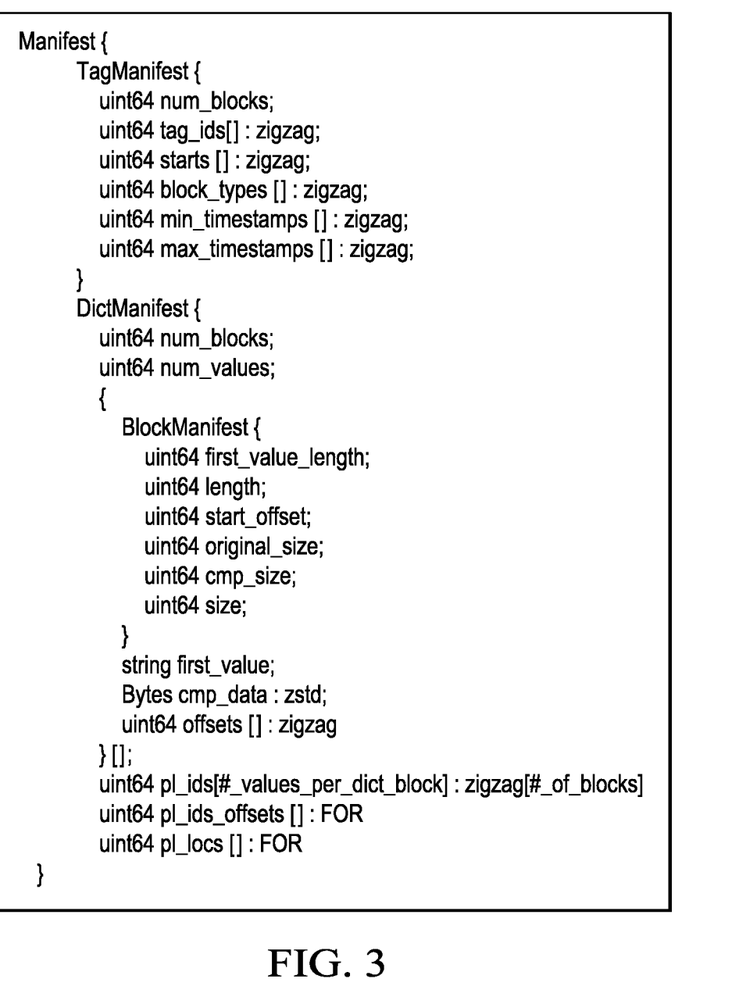
FIG. 3 depicts a representative manifest.hdx file.
Figure 4:
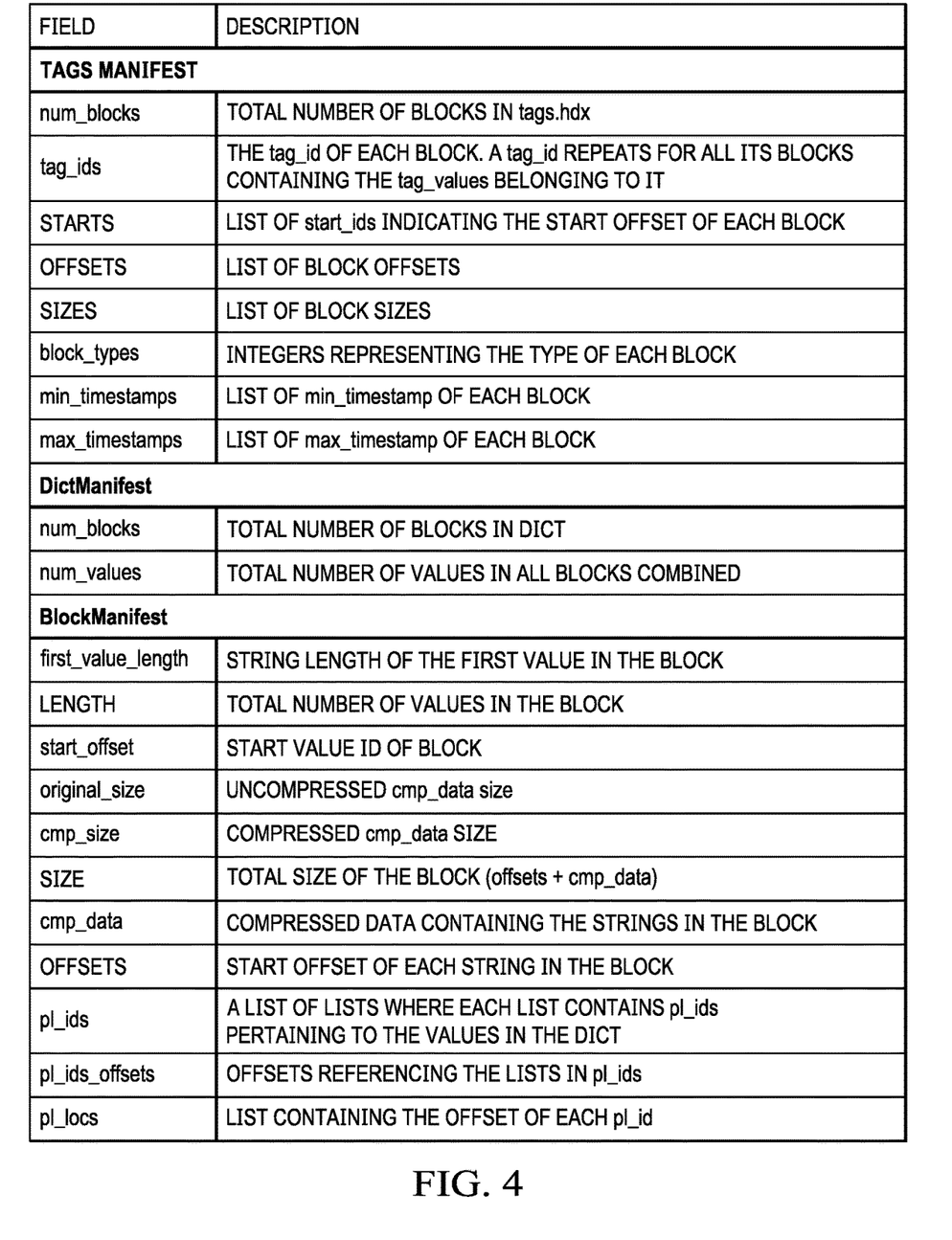
FIG. 4 identifies the fields of the manifest.hdx file and their accompanying definitions.

FIG. 3 depicts a representative manifest.hdx file 200, and FIG. 4 identifies the fields of this file and their accompanying definitions.

Figure 5:
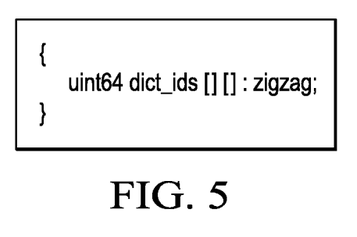
FIG. 5 depicts a representative tag portion of the data.hdx file.

The tags portion of the data.hdx file stores dict_ids contiguously in blocks for each tag_name. Preferably, no blocks from other tag_names interleave. This minimizes the number of requests that are needed to download the values for a particular tag. The format for this file is depicted in FIG. 5.

Figure 6:
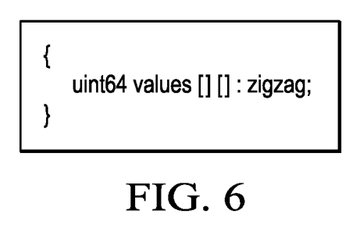
FIG. 6 depicts a representative values portion of the data.hdx file.

The values portion of the data.hdx file follows a similar structure, and it is depicted in FIG. 6. This file stores metric values contiguously in blocks for each metric_name.

Figure 7:
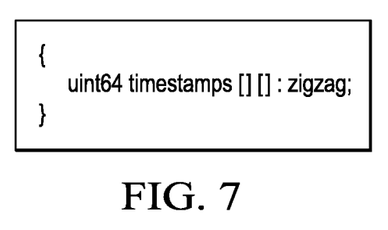
FIG. 7 depicts a representative timestamps portion of the data.hdx file.

The timestamps portion of the data.hdx file also follows a similar structure, and it is depicted in FIG. 7.

Figure 8:
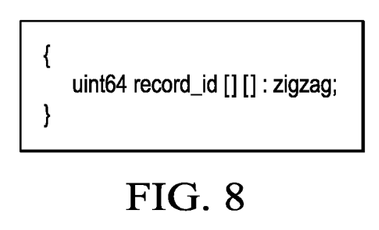
FIG. 8 depicts a representative index.hdx file.

The index.hdx file contains posting-lists for each value in the dictionary. These posting list blocks preferably are downloaded for each term in the query. The format is depicted in FIG. 8.

The following is an example of the HDX data layout. In particular, assume that the indexer service receives the data set shown in FIGS. 9A-9B. There are two (2) schemas detected in this data set, namely: Schema 1 (pop node turbine_version namespace namespace_version push_messages push_errors queue_depth); and Schema 2 (pop node namespace, namespace_version push_messages push_errors queue depth).

Figure 10A:
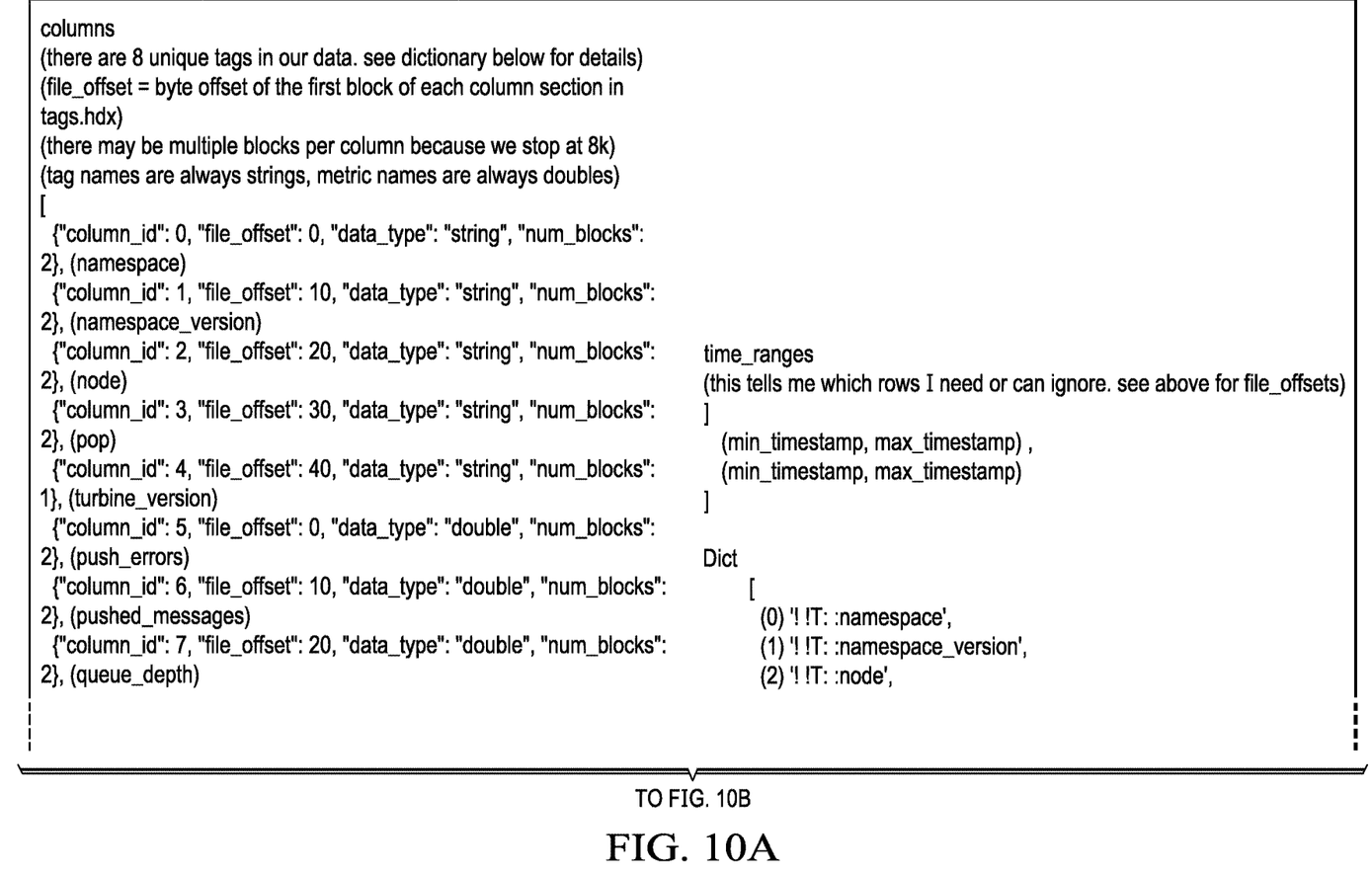
FIGS. 10A and 10B depict a manifest.hdx file derived from the sample data set.
Figure 10B:
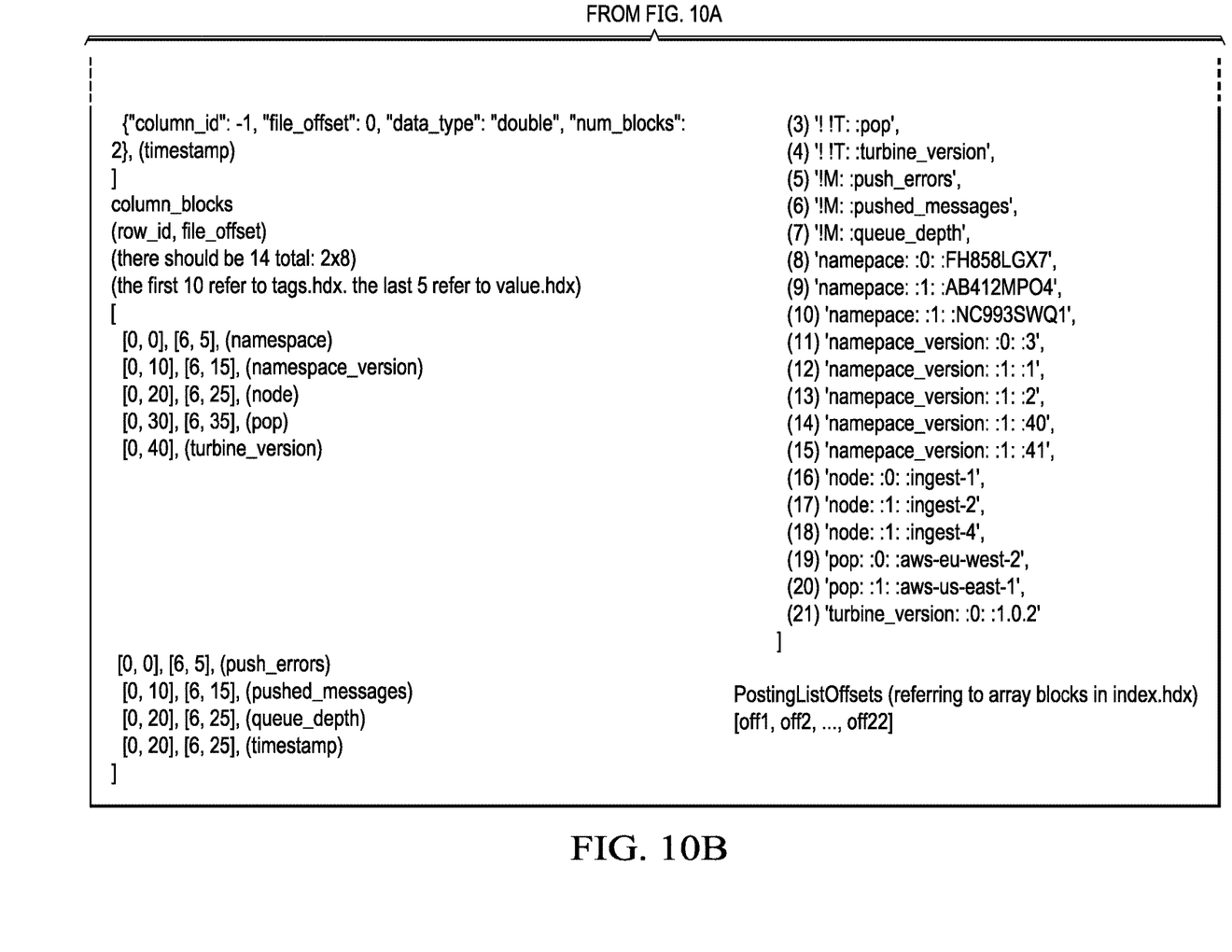
Figure 11:
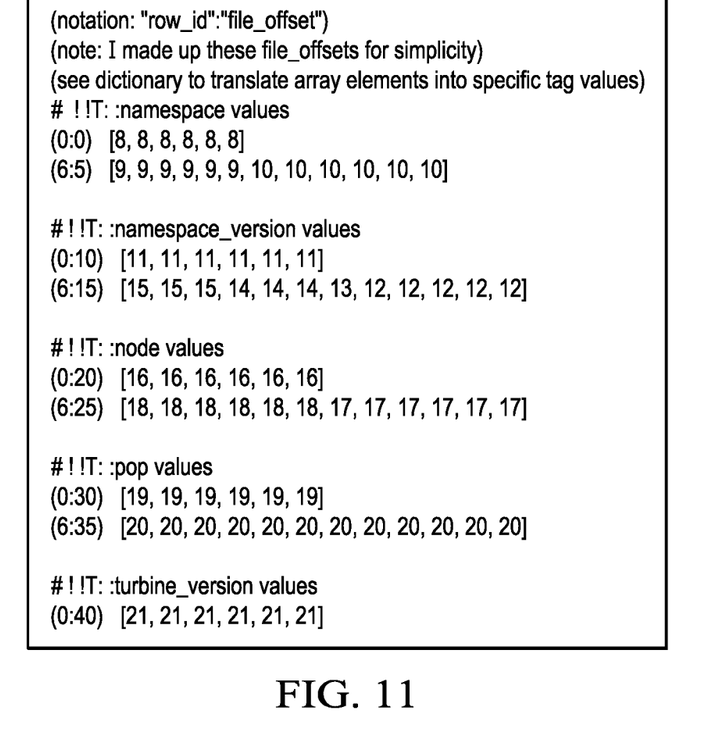
FIG. 11 depicts a tag portion of the data.hdx file derived from the sample data set.
Figure 12:
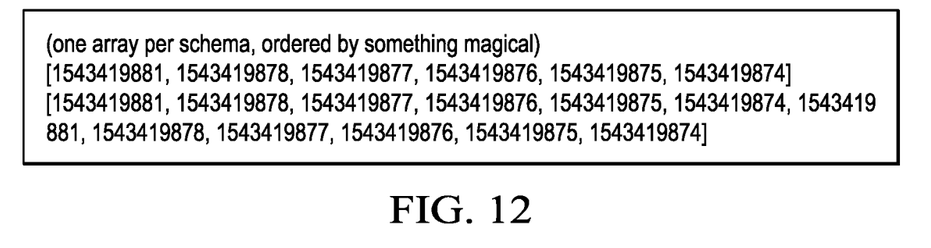
FIG. 12 depicts a timestamps portion of the data.hdx file derived from the sample data set.

The dictionary (dict) value have::0:: and ::1:: appended to the tag's values. Further, there will be two arrays for each tag name's values in the tags portion of the data.hdx file, in the values portion of the data.hdx file, and in the timestamps portion of the data.hdx file. Each array belongs to a group, however, they are still stored contiguously in the respective file, as previously described. After this data set is ingested and indexed by the indexer service, the resulting HDX files are then shown in FIGS. 10A and 10B (manifest.hdx), FIG. 11 (data.hdx tags portion), FIG. 12 (data.hdx timestamps portion), FIG. 13 (data.hdx values portion), and FIG. 14 (index.hdx).

The high density time-series data indexing and compression described above facilitate an efficient search and retrieval of the time-series based columnar-based information. The following describes a representative process flow to search an HDX part for records matching given criteria in the query. The process starts with the search service downloading manifest.hdx if it is not found in local cache on disk (at the query peer). Then, the manifest.hdx file is decoded lazily by first decoding the block information arrays (offsets, types, sizes); at this step the dictionary also is lazy decoded without decompressing the dictionary blocks. Using the dictionary, the terms to be searched are identified. Then, the query peer then issues HTTP GET requests on index.hdx to obtain the posting lists for the terms found. The posting-lists obtained are then intersected to obtain the final block_ids that are needed to be fetched. The query peer then issues GET requests to download the block_ids for each of tags.hdx/values.hdx/timestamps.hdx. Once the block_id=x is received from each of the files, a ColumnsBlock is composed containing the sub blocks. The result is then passed on (e.g., a query execution engine) for further processing. This operation also includes materializing each tag block and converting its tag_id to the string value it references.

Generalizing the above, the HDX file format comprises a set of files, namely, at least a manifest file, a data file, and an index file. The manifest file includes a dictionary of data strings seen in a column during indexing of the information, together with byte-range data configured to selectively retrieve data from the data and index files. The data file stores column data seen during the indexing, and the index file contains a listing (e.g., a posting-list) for each data string in the manifest file. In this approach, the column data is stored in the data file in contiguous byte-ranges. As data is streamed into the compute infrastructure, it is continuously processed by the indexer and transferred to cloud-based object store where it is stored in the set of time-based partitions and according to the HDX file format.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the ingest, index, search and retrieval functions is non-transitory.

A given implementation of the disclosed subject matter is software written in a given programming language that runs on a server on commodity hardware platform running an operating system, such as Linux. As noted above, the above-described ingest, index, search and retrieval functions may be implemented as well as a virtual machine or appliance, or in any other tangible manner.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed is as follows:

1. A computing system, comprising:
   at least one hardware processor;
   computer memory holding computer program code executed on the hardware processor, the program code configured as a first service to:
   receive time-series columnar-based information from a data source, wherein the time-series columnar-based information comprises column data and a set of time-based partitions;
   index the time-series columnar-based information into a set of files according to a file format:
      wherein the set of files comprises a first file, a second file, and a third file,
      wherein the first file comprises a set of data strings seen in a column of the time-series columnar-based information during the indexing and byte-range data used to retrieve data from the second and third files,
      wherein the second file stores the column data of the time-series columnar-based information seen during the indexing into contiguous byte-ranges, and
      wherein the third file contains a list structure for each data string of the set of data strings in the first file,
      wherein the first file, the second file and the third file for a given partition of the set of time-based partitions together comprise a compact instance of a set of raw unstructured data that comprises the given partition of the set of time-based partitions; and
   transfer the set of files to a cloud-based object store.

2. The computing system as described in claim 1, wherein the program code is further configured as a second service to merge a plurality of files stored in the cloud-based object store based on at least one of a volume of file data, a network location, and processing resources.

3. The computing system as described in claim 2, wherein the second service executes one of on-demand, periodically or continuously.

4. The computing system as described in claim 1, wherein the file format is schema-less.

5. The computing system as described in claim 1, wherein the first service is further configured to issue a notification to a third service to catalog the transferred set of files.

6. A method for data indexing, comprising:
   receiving time-series columnar-based information from a data source, wherein the time-series columnar-based information comprises column data and a set of time-based partitions;
   indexing the time-series columnar-based information into a set of files according to a file format:
      wherein the set of files comprises a first file, a second file, and a third file,
      wherein the first file comprises a set of data strings seen in a column of the time-series columnar-based information during the indexing and byte-range data used to retrieve data from the second and third files,
      wherein the second file stores the column data of the time-series columnar-based information seen during the indexing into contiguous byte-ranges, and
      wherein the third file contains a list structure for each data string of the set of data strings in the first file,
      wherein the first file, the second file and the third file for a given partition of the set of time-based partitions together comprise a compact instance of a set of raw unstructured data that comprises the given partition of the set of time-based partitions; and
   transferring the set of files to a cloud-based object store.

7. The method as described in claim 6, further comprising merging a plurality of files stored in the cloud-based object store based on at least one of a volume of file data, a network location, and processing resources.

8. The method as described in claim 7, wherein the merging executes one of on-demand, periodically or continuously.

9. The method as described in claim 6, wherein the file format is schema-less.

10. The method as described in claim 6, further comprising issuing a notification to catalog the transferred set of files.

11. A non-transitory computer-readable medium storing instructions for data indexing that, when executed by one or more hardware processors, cause:
   receiving time-series columnar-based information from a data source, wherein the time-series columnar-based information comprises column data and a set of time-based partitions;
   indexing the time-series columnar-based information into a set of files according to a file format:
      wherein the set of files comprises a first file, a second file, and a third file,
      wherein the first file comprises a set of data strings seen in a column of the time-series columnar-based information during the indexing and byte-range data used to retrieve data from the second and third files,
      wherein the second file stores the column data of the time-series columnar-based information seen during the indexing into contiguous byte-ranges, and
      wherein the third file contains a list structure for each data string of the set of data strings in the first file,
      wherein the first file, the second file and the third file for a given partition of the set of time-based partitions together comprise a compact instance of a set of raw unstructured data that comprises the given partition of the set of time-based partitions; and
   transferring the set of files to a cloud-based object store.

12. The non-transitory computer-readable medium as described in claim 11, wherein the instructions further cause merging a plurality of files stored in the cloud-based object store based on at least one of a volume of file data, a network location, and processing resources.

13. The non-transitory computer-readable medium as described in claim 12, wherein the merging executes one of on-demand, periodically or continuously.

14. The non-transitory computer-readable medium as described in claim 11, wherein the file format is schema-less.

15. The non-transitory computer-readable medium as described in claim 11, wherein the instructions further cause issuing a notification to catalog the transferred set of files.

* * * * *